(12) United States Patent
Choi et al.

(10) Patent No.: US 7,132,955 B2
(45) Date of Patent: Nov. 7, 2006

(54) DOMESTIC APPLIANCE

(75) Inventors: Kang Ho Choi, Gyeonggi-Do (KR); Masao Koseki, Saitama-Ken (JP)

(73) Assignees: Samsung Electronics Co., Ltd, Gyeonggi-do (KR); Sanyo Air-Conditioners Co., Ltd., Gunma-ken (JP); Sanyo Electric Co., Ltd., Osaka-fu (JP)

( * ) Notice: Subject to any disclaimer, the term of this patent is extended or adjusted under 35 U.S.C. 154(b) by 345 days.

(21) Appl. No.: 10/849,227

(22) Filed: May 20, 2004

(65) Prior Publication Data

US 2005/0134476 A1 Jun. 23, 2005

(30) Foreign Application Priority Data

Dec. 19, 2003 (KR) .................. 10-2003-0093712

(51) Int. Cl.
*G08C 19/00* (2006.01)
*H04B 10/00* (2006.01)
*H01H 33/46* (2006.01)
*G09G 5/00* (2006.01)

(52) U.S. Cl. .................. 340/825.69; 340/825.52; 340/825.56; 340/5.61; 398/106; 200/50.12; 200/61.62; 345/156; 345/157

(58) Field of Classification Search .......... 340/825.69, 340/825.52, 825.56, 5.61; 398/106; 200/50.12, 200/61.62; 345/156, 157
See application file for complete search history.

(56) References Cited

U.S. PATENT DOCUMENTS

| 5,181,024 | A | * | 1/1993 | Tsunoda et al. | ....... 340/825.69 |
| 5,545,891 | A | * | 8/1996 | Smith | .................... 250/214 AL |
| 5,587,642 | A | * | 12/1996 | Manson et al. | ............. 318/812 |
| 6,198,408 | B1 | * | 3/2001 | Cohen | .................... 340/825.69 |

FOREIGN PATENT DOCUMENTS

KR  2002-0088791 A  11/2002

* cited by examiner

*Primary Examiner*—Jeffery Hofsass
*Assistant Examiner*—Scott Au
(74) *Attorney, Agent, or Firm*—Sughrue Mion, PLLC

(57) ABSTRACT

A domestic appliance is provided having a control panel in which a remote control signal passing part is formed on a manipulating member, and the manipulating member is integrated with a display window. The control panel includes a switch to be selectively turned on and off by relative movement of a moving part and a fixed part. The manipulating member is configured to be operated in conjunction with the moving part to selectively turn on and off the switch and is provided with the remote control signal passing part to allow a signal from a remote controller to pass. A signal-receiving unit is placed behind the manipulating member to receive the remote control signal through the manipulating member. The domestic appliance of the present invention is effective in reducing costs and time required for separately forming of a signal-receiving window, and miniaturizing products.

23 Claims, 4 Drawing Sheets

DOMESTIC APPLIANCE

CROSS-REFERENCE TO RELATED APPLICATION

This application claims the benefit of Korean Patent Application No. 2003-93712, filed Dec. 19, 2003 in the Korean Intellectual Property Office, the disclosure of which is incorporated herein by reference.

BACKGROUND OF THE INVENTION

1. Field of the Invention

Apparatuses consistent with the present invention relate in general, to domestic appliances and, more particularly, to a domestic appliance having a control panel in which a remote control signal-receiving window is formed on a manipulating member, and the manipulating member is integrated with a display window.

2. Description of the Related Art

In general, domestic appliances refer to electric and electronic appliances used at home, which include video/audio appliances, such as televisions and radios, electrical heating appliances for cooking, electrical heating appliances for heating, illumination appliances, vacuum cleaners, electrical washing machines, refrigerators, and air conditioners. A remote controller is used to allow a user, who is spaced apart from a domestic appliance within a predetermined distance, to control the domestic appliance using wireless communications, such as communications using an infrared ray or supersonic waves. The domestic appliance is provided with a control panel to allow the user to control the domestic appliance, and a signal-receiving unit to receive a signal transmitted from the remote controller. Switches including a power switch to supply and cut off power and a display unit to show operational status to the user are placed in the control panel.

An air conditioner disclosed in Korean Unexamined Pat. Publication No. 2002-0088791 is an example of the domestic appliance. In a power switch unit of the disclosed air conditioner, a display device, a signal-receiving unit, and a power switch are formed on a single circuit board. The power switch is selectively turned on and off by a manipulating member, and the display device and the signal-receiving unit are mounted to be viewed from outside the air conditioner through a display window. The display window further functions as a remote control signal-receiving window.

However, in the conventional domestic appliance, the manipulating member and the remote control signal-receiving window are separately formed, so that problems arise in that material costs increase, an assembly process is complicated, and it is difficult to miniaturize the domestic appliance.

Furthermore, since the manipulating member is not supported by an elastic member and relies on elasticity of the power switch, the power switch may be operated even by an excessively weak force. Additionally, when a relatively strong force is applied, the power switch may be damaged.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Accordingly, it is an aspect of the present invention to provide a domestic appliance, which improves manufacturing efficiency thereof and is miniaturized by integrating a manipulating member with a remote control signal-receiving window.

It is another aspect of the present invention to provide a domestic appliance, which is provided with a rod-shaped elastic support part integrated with the manipulating member, so that a switch is not turned on and off by a relatively weak force and is not damaged by a relatively strong force.

Additional aspects and/or advantages of the invention will be set forth in part in the description which follows and, in part, will be obvious from the description, or may be learned by practice of the invention.

In an exemplary, non-limiting embodiment, it is contemplated that aspects of the invention are achieved by providing a domestic appliance having a control panel, the control panel including a switch to be selectively turned on and off by relative movement of a moving part and a fixed part, a manipulating member configured to be operated in conjunction with the moving part to selectively turn on and off the switch and provided with a remote control signal passing part to allow a signal from a remote controller to pass, and a signal-receiving unit placed behind the manipulating member to receive a remote control signal through the manipulating member.

The signal-receiving unit may include a light-receiving diode to detect an infrared remote control signal, and the remote control signal passing part may be made of a material through which an infrared ray passes.

The manipulating member may be provided with a switch interlocking part, and the domestic appliance may further include an electrical component unit in which the switch is placed at a location corresponding to a location of the switch interlocking part and the signal-receiving unit is placed at a location corresponding to a location of a center of the manipulating member.

It is also contemplated that the manipulating member has a surface which is pressed by a user to turn on and off the switch. This surface is disposed at a location in front of the signal-receiving unit and is part of the remote control signal passing part, such that the remote control signal passes through the surface and reaches the signal-receiving unit.

It is further contemplated that the switch and the signal-receiving unit may be placed on a same base plate. The switch may include a push button switch, and the domestic appliance may further include a plate-shaped elastic support part a first end of which is fastened to the manipulating member and a second end of which is fastened to a support surface to elastically support the manipulating member.

The manipulating member may be provided with a switch interlocking part at a first end of the manipulating member to make contact with the switch, the manipulating member may be provided with a fixed member at a second end of the manipulating member to make contact with a support surface, and the elastic support part may be fastened between the switch interlocking part and the support part at an end of the elastic support part. The elastic support part and the manipulating member may be integrated with each other.

The domestic appliance may further include a display unit placed in a body of the domestic appliance to display operational status of the domestic appliance, and a display window formed in a portion of the elastic support part fastened to the body at a location corresponding to a location of the display unit to be integrated with the elastic support part so as to allow a user to view the operational status.

Even further, the display unit may include a plurality of light-emitting diodes. The display unit and the signal-receiving unit may be placed on a same base plate. The elastic support part, the display window and the manipulating member may be integrated with each other. The elastic support part, the display window and the switch may be integrated with each other into a synthetic resin mold.

The domestic appliance may further include a cover provided with a display hole and a through-hole and attached to the body to form an appearance of the control panel, wherein the mold is fastened to the cover so that the display window is placed in the display hole and the manipulating member is exposed through the through-hole. The manipulating member may have provided thereon retaining parts at an edge of the manipulating member to prevent the manipulating member from being separated from the cover through the through-hole. The cover may be detachably mounted in a recess formed in the body. Also, the mold may be made of a translucent material having a predetermined amount of elasticity.

It is even further contemplated that aspects of the invention are achieved by providing a domestic appliance having a control panel, the control panel including a switch to be selectively turned on and off by relative movement of a moving part and a fixed part, and a manipulating member provided with a switch interlocking part to be operated in conjunction with the moving part to selectively turn on and off the switch. A rod-shaped elastic support part is extended from an end of the manipulating member and fastened to the fixed member at an end of the rod-shaped elastic support part.

The switch interlocking part may be formed on a first end of the manipulating member, the manipulating member may be provided with a support part, which is supported by a support surface, at a second end of the manipulating member, and the elastic support part may be extended from the manipulating member at a location between the switch interlocking part and the support part. The manipulating member and the elastic support part may be made of a same material to be integrated with each other.

BRIEF DESCRIPTION OF THE DRAWINGS

These and other aspects and advantages of the invention will become apparent and more readily appreciated from the following description of the exemplary embodiments, taken in conjunction with the accompanying drawings of which.

DETAILED DESCRIPTION OF NON-LIMITING, ILLUSTRATIVE EMBODIMENTS OF THE INVENTION

Figure 1:
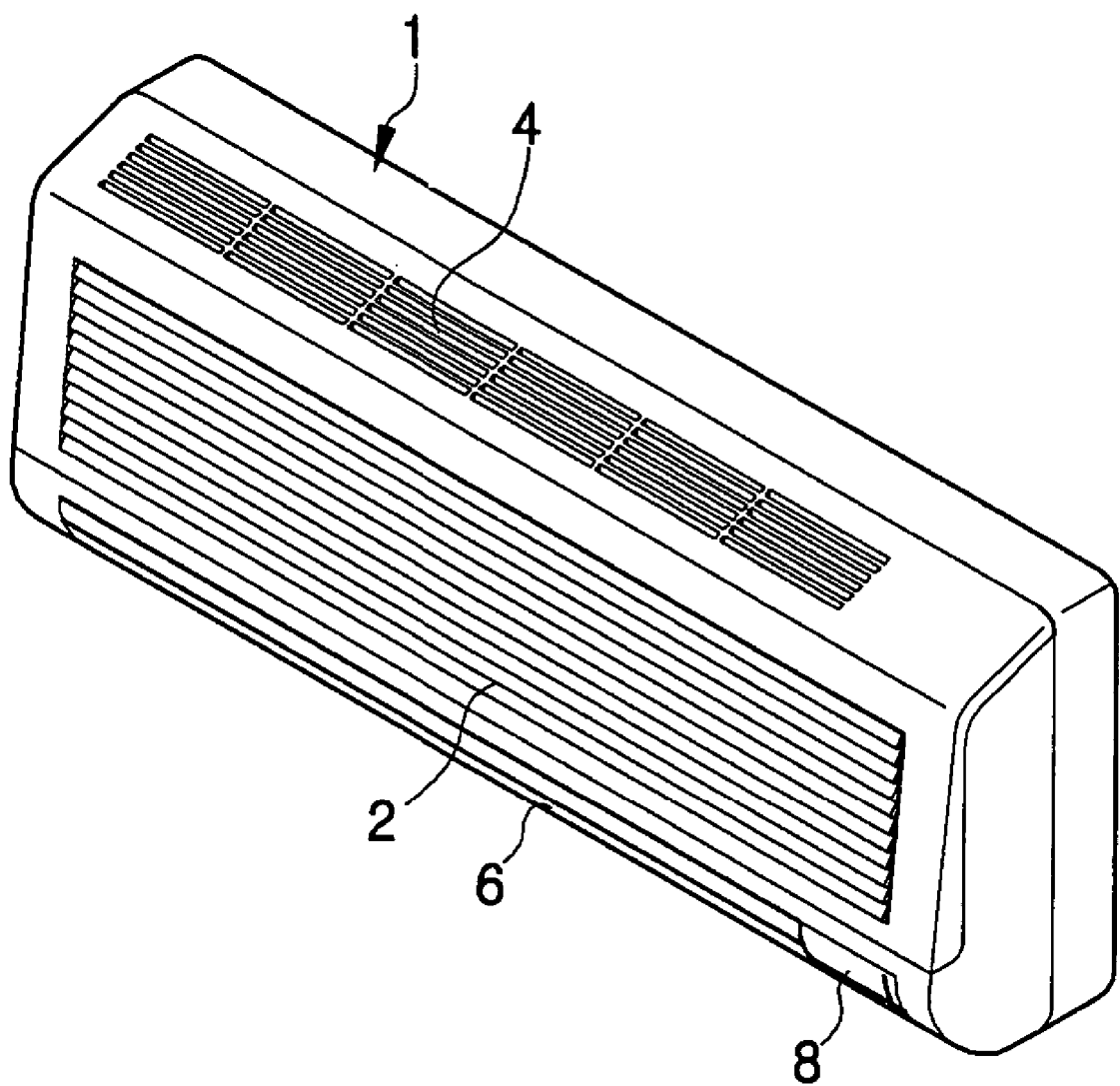
FIG. 1 is a perspective view showing an appearance of a domestic appliance, according to a non-limiting, illustrative embodiment of the present invention.

Reference will now be made in detail to embodiments of the present invention, examples of which are illustrated in the accompanying drawings, wherein like reference numerals refer to like elements throughout.

FIG. 1 is a perspective view showing an exemplary domestic appliance, according to the present invention. In the present embodiment, the invention is described using an air conditioner as an example of the domestic appliance. However, the invention can be applied to other domestic appliances, as would be appreciated by one skilled in the art.

Referring to FIG. 1, the air conditioner of the present invention includes a body 1, an upper grill 4 placed on an upper side of the body 1, a front grill 2 placed on a front side of the body 1, a discharge opening 6 placed on a lower portion of the body 1, and a control panel 8 placed to a right side of the discharge opening 6.

Indoor air is drawn into the body 1 through the upper and front grills 4 and 2, the drawn air is cooled by a heat exchanger (not shown), and the air refrigerated by the heat exchanger is discharged into the room through the discharge opening 6. The control panel 8 receives a control signal from a user and transmits the control signal to a control unit (not shown) electrically connected to the control panel 8, thus controlling the air conditioner.

Figure 2:
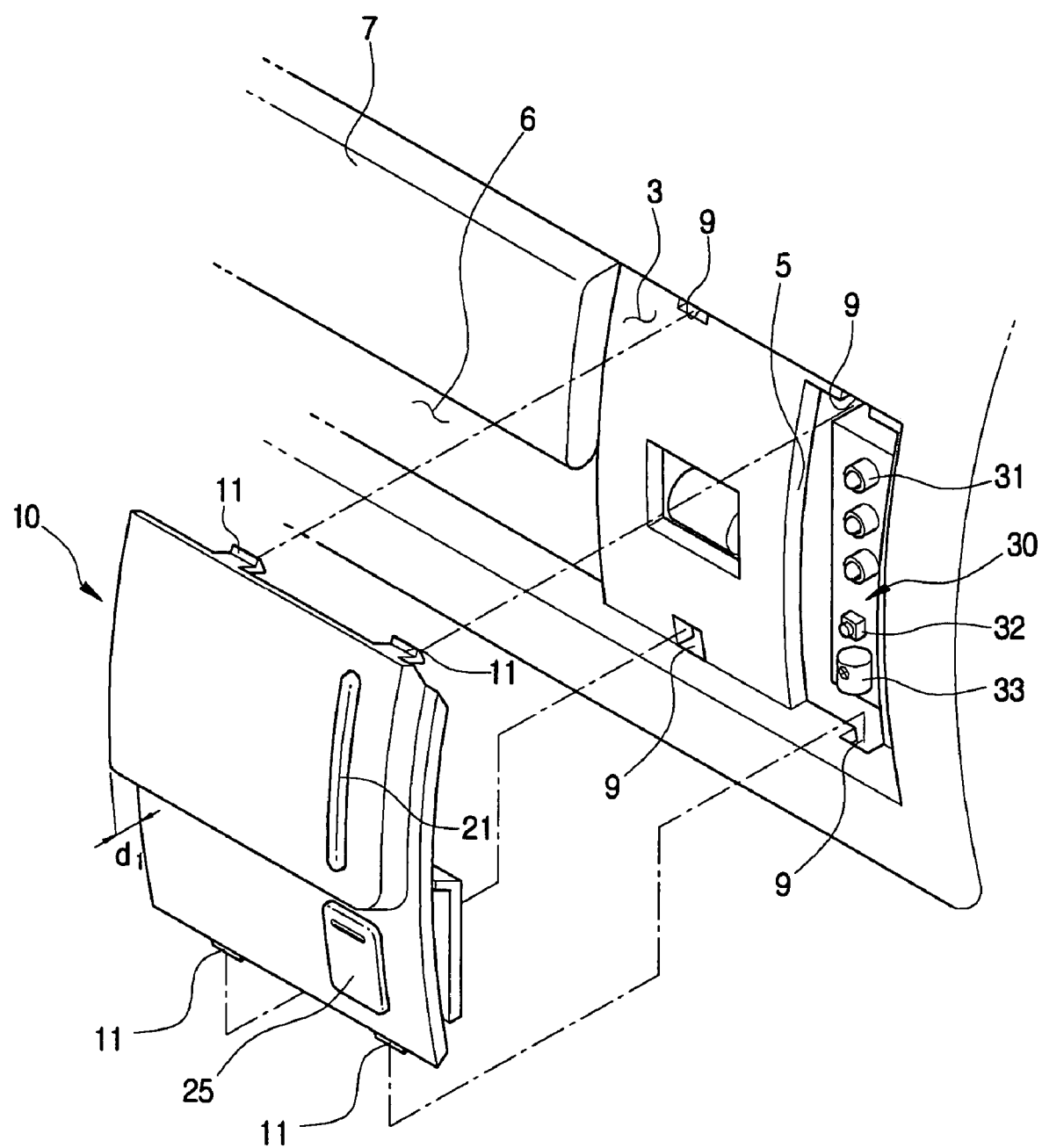
FIG. 2 is an exploded perspective view showing a control panel of the domestic appliance of FIG. 1.

FIG. 2 is an exploded perspective view showing the control panel of the domestic appliance of FIG. 1. As shown in FIG. 2, the domestic appliance according to the embodiment of the present invention includes a cover 10 placed to be detachably attached to a recess 3 formed on the lower portion of the body 1, and an electrical component area 30 placed in a cavity 5 formed in the recess 3.

A display window 21 and a manipulating member 25 are formed on a front side of the cover 10, and hooks 11 are formed at upper and lower ends of the cover 10. Locking slots 9 are formed at upper and lower ends of the recess 3 at locations corresponding to the locations of the hooks 11 to allow the cover 10 to be detachably attached to the body 1. An upper portion of the cover 10 is projected forward to be spaced apart from a lower portion of the cover 10 by a predetermined interval d1 and to allow the upper portion of the cover 10 to be even with a discharge blade 7.

The electrical component unit 30 is used to receive a control signal from a user and transmit the control signal to the control unit (not shown), and is electrically connected to the control unit. A display unit 31 is formed on an upper portion of the electrical component unit 30 to display the operational status of the body 1. The display unit 31 includes a plurality of light-emitting diodes. A switch 32 is placed below the display unit 31 to selectively supply and cut off power to and from the air conditioner. The switch 32 is operated in such a way that the air conditioner is turned on by pressing a push button once, and the air conditioner is turned off by pressing the push button once more. A signal-receiving unit 33 is formed below the switch 32. The signal-receiving unit 33 is used to receive a signal from a remote controller. When an infrared signal is generated from a light-emitting diode (not shown) placed in the remote controller, a light-receiving diode of the signal-receiving unit 33 receives the infrared signal and the infrared signal is used to control the air conditioner. The display unit 31, the switch 32, and the signal-receiving unit 33 are placed on a same base plate (not shown) in the electrical component unit 30.

Figure 3:
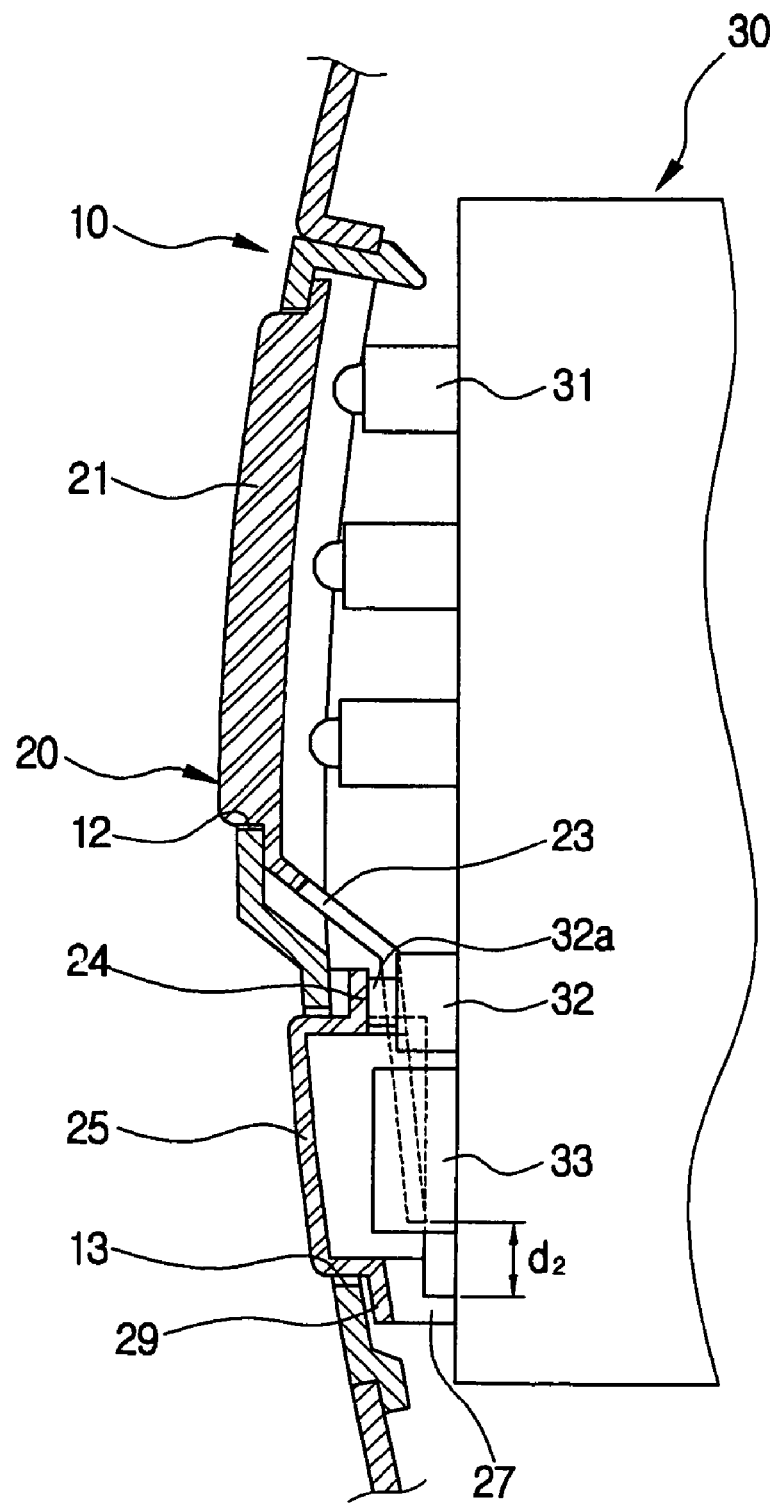
FIG. 3 is a cross-section showing the control panel of the domestic appliance of FIG. 2.
Figure 4:
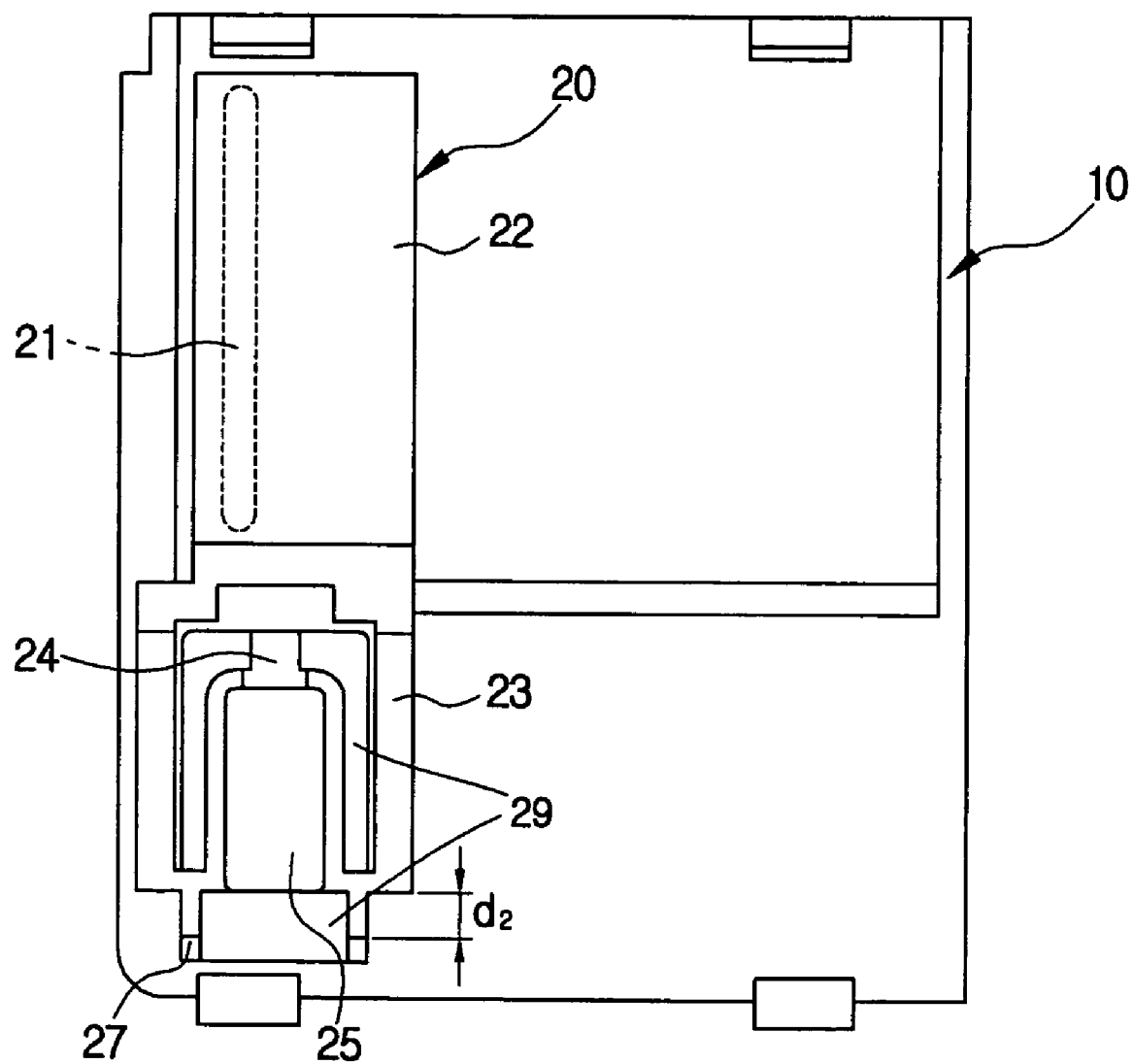
FIG. 4 is a rear view showing a cover of the domestic appliance of FIG. 2.

FIG. 3 is a cross-section showing the control panel 8 of the domestic appliance of FIG. 1. FIG. 4 is a rear view showing the cover 10 of the domestic appliance of FIG. 1. The cover 10 of the domestic appliance of the present invention is described in more detail with reference to FIGS. 3 to 4 below.

A display hole 12 and a through-hole 13 are formed in a surface of the cover 10 of the domestic appliance. A mold 20 including the display window 21 to cover the display hole 12, the manipulating member 25 operated in conjunction with the switch 32, and an elastic support part 23 to connect the display unit 21 with the manipulating member 25 and to support the manipulating member 25 are placed behind the cover 10.

The display window 21 is formed at a location corresponding to the location of the display unit 31 to allow a user to view a signal generated from the display unit 31, and covers the display hole 12 formed in the cover 10. Since the display window 21 is made of a transparent or translucent material, an image or a light signal generated from the display unit 31 is irradiated outside through the display window 21. The display window 21, along with a fixed member 22 (see FIG. 4) placed around the display window 21, is fastened to the cover 10.

The manipulating member 25 placed below the display window 21 is exposed outside the cover 10 through the through-hole 13. The manipulating member 25 is made of a transparent or translucent material so as to allow a remote control signal, that is, an infrared ray from the remote controller to pass therethrough. A switch interlocking part 24 is formed on an upper portion of the manipulating member 25 in order to come in contact with the switch 32, and a support part 27 is formed on a lower portion of the manipulating member 25 to protrude to the electrical component unit 30 and in order to come in contact with the electrical component unit 30. The support part 27 is supported by the electrical component unit 30, and thus the electrical component unit 30 acts as a support surface of the support part 27. The manipulating member 25 is formed at a location to allow the signal-receiving unit 33 to be located behind the manipulating member 25, so that a remote control signal passes through the manipulating member 25 and reaches the signal-receiving unit 33. Retaining parts 29 are formed at an edge of the manipulating member 25 to limit a moving range of the manipulating member 25 and to prevent the manipulating member 25 from being separated from the cover 10.

The elastic support part 23 is formed between the manipulating member 25 and the display window 21. The display window 21, the fixed member 22 (see FIG. 4), the elastic support part 23, and the manipulating member 25 are integrally injection molded using a same material. Since the mold 20 must pass a visible ray through the display window 21, must pass an infrared ray through the manipulating member 25 and must have elasticity to elastically support the manipulating member 25, the mold 20 is made of a material having these three requirements. The elastic support part 23 is formed to have a rod or plate shape, a center portion of which is bent to be operated without interference with other elements. Furthermore, an end of the elastic support part 23 is formed to be spaced apart from the support part 27 of the manipulating member 25 by a predetermined interval d2. The support part 27 makes contact with the electrical component unit 30 fastened to the body 1, and the switch interlocking part 24 is brought into contact with a moving part 32a, which will be inserted into the switch 32 fixed to the electrical component unit 30, when a pressure is applied to the switch interlocking part 24 from outside the switch interlocking part 24. Accordingly, when the user presses the manipulating member 25, the manipulating member 25 presses the switch 32 while rotating around the support part 27. In this case, the elastic support part 23, a first end of which is supported by the fixed member 22 (see FIG. 4) fastened to the cover 10 and a second end of which is connected to the manipulating member 25, elastically supports the manipulating member 25. Thus, the user must apply a force having a predetermined magnitude to selectively turn on and off the switch 32, and the switch 32 is prevented from being damaged even when a relatively strong force is applied to the switch 32 because the force is distributed to the elastic support part 23. Furthermore, the interval d2 between the end of the elastic support part 23 and the support part 27 is determined to provide an appropriate elastic force. When the interval d2 is smaller, a deforming displacement of the elastic support part 23 is reduced, so that a relatively weak force is applied to the elastic support part 23. In contrast, when the interval d2 is larger, the deforming displacement of the elastic support part 23 is increased, so that the user must apply a relatively strong force to the elastic support part 23 to selectively turn on and off the switch 32.

As described in detail above, the domestic appliance of the present invention includes the manipulating member to allow a remote control signal transmitted from the remote controller to pass therethrough, thus reducing costs and time required for forming of a signal-receiving window and allowing products to be miniaturized.

Furthermore, since the display window and the manipulating member are integrated with the elastic support part, an assembly process is shortened compared to a case where the display window and the manipulating member are separately formed, thus improving manufacturing efficiency of the control panel.

Furthermore, since the manipulating member is provided with the elastic support part having a rod shape, the switch is not turned on and off by a relatively weak force and is not damaged by a relatively strong force. Additionally, a relevant construction of the present invention is simplified compared to a case where the manipulating member is elastically supported by a spring, so that an assembly process is simplified and a number of components is reduced, thus improving manufacturing efficiency of the control panel.

Furthermore, the display window, the elastic support part, and the manipulating member functioning as a remote control receiving window are integrated with each other, so that the assembly process is simplified and a number of components is reduced, thus improving manufacturing efficiency of the control panel.

Furthermore, two or more of the display units, the switch, and the remote control receiving unit are formed on a single base plate, so that a number of components is reduced, the assembly process is simplified and products are miniaturized.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A domestic appliance having a control panel, the control panel comprising:
   a switch to be selectively turned on and off by relative movement of a moving part and a fixed part;
   a manipulating member configured to be operated in conjunction with the moving part to selectively turn on and off the switch, and provided with a remote control signal passing part to allow a signal from a remote controller to pass; and
   a signal-receiving unit placed behind the manipulating member to receive a remote control signal through the manipulating member.

2. The domestic appliance as set forth in claim 1, wherein:
the signal-receiving unit comprises a light-receiving diode to detect an infrared remote control signal; and
the remote control signal passing part is made of a material through which an infrared ray passes.

3. The domestic appliance as set forth in claim 1, wherein the manipulating member is provided with a switch interlocking part; and
the domestic appliance further comprises an electrical component unit in which the switch is placed at a location corresponding to a location of the switch interlocking part and the signal-receiving unit is placed at a location corresponding to a location of a center of the manipulating member.

4. The domestic appliance as set forth in claim 3, wherein the switch and the signal-receiving unit are placed on a same base plate.

5. The domestic appliance as set forth in claim 1, wherein the switch includes a push button switch; and
the domestic appliance further comprises a plate-shaped elastic support part, a first end of which is fastened to the manipulating member and a second end of which is fastened to a support surface to elastically support the manipulating member.

6. The domestic appliance as set forth in claim 5, wherein:
the manipulating member is provided with a switch interlocking part at a first end of the manipulating member to make contact with the switch;
the manipulating member is provided with a support part at a second end of the manipulating member to make contact with the support surface; and
the elastic support part is fastened between the switch interlocking part and the support part of the second end of the manipulating member, at an end of the elastic support part.

7. The domestic appliance as set forth in claim 5, wherein the elastic support part and the manipulating member are integrated with each other.

8. The domestic appliance as set forth in claim 5, further comprising:
a display unit placed in a body of the domestic appliance to display operational status of the domestic appliance; and
a display window formed in a portion of the elastic support part fastened to the body at a location corresponding to a location of the display unit to be integrated with the elastic support part so as to allow a user to view an operational status.

9. The domestic appliance as set forth in claim 8, wherein the display unit includes a plurality of light-emitting diodes.

10. The domestic appliance as set forth in claim 8, wherein the display unit and the signal-receiving unit are placed on a same base plate.

11. The domestic appliance as set forth in claim 8, wherein the elastic support part, the display window and the manipulating member are integrated with each other.

12. The domestic appliance as set forth in claim 11, wherein the elastic support part, the display window and the switch are integrated with each other into a synthetic resin mold.

13. The domestic appliance as set forth in claim 12, further comprising a cover provided with a display hole and a through-hole and attached to the body to form an appearance of the control panel, wherein the mold is fastened to the cover so that the display window is placed in the display hole and the manipulating member is exposed through the through-hole.

14. The domestic appliance as set forth in claim 13, wherein the manipulating member is provided with retaining parts at an edge of the manipulating member to prevent the manipulating member from being separated from the cover through the through-hole.

15. The domestic appliance as set forth in claim 13, wherein the cover is detachably mounted in a recess formed in the body.

16. The domestic appliance as set forth in claim 12, wherein the mold is made of a translucent material having a predetermined amount of elasticity.

17. The domestic appliance as set forth in claim 1, wherein the manipulating member has a surface which is pressed by a user to turn on and off the switch, the surface being disposed at a location in front of the signal-receiving unit and is part of the remote control signal passing part, such that the remote control signal passes through the surface and reaches the signal-receiving unit.

18. The domestic appliance as set forth in claim 17, wherein the remote control signal is an infrared signal.

19. A domestic appliance having a control panel, the control panel comprising:
a switch to be selectively turned on and off by relative movement of a moving part and a fixed part; and
a manipulating member provided with a switch interlocking part to be operated in conjunction with the moving part to selectively turn on and off the switch, and a rod-shaped elastic support part extended from an end of the manipulating member and fastened to a fixed member at an end of the rod shaped elastic support part.

20. The domestic appliance as set forth in claim 19, wherein:
the switch interlocking part is formed on a first end of the manipulating member;
the manipulating member is provided with a support part, which is supported by a support surface, at a second end of the manipulating member; and
the elastic support part is extended from the manipulating member at a location between the switch interlocking part and the support part at the second end of the manipulating member.

21. The domestic appliance as set forth in claim 19, wherein the manipulating member and the elastic support part are made of a same material to be integrated with each other.

22. The domestic appliance as set forth in claim 19, wherein the manipulating member has a surface which is pressed by a user to turn on and off the switch, the surface being made of a material that allows a signal from a remote controller to pass.

23. The domestic appliance as set forth in claim 22, wherein the signal is an infrared signal.

* * * * *